United States Patent [19]

Rafaely

[11] 4,188,911
[45] Feb. 19, 1980

[54] ENCLOSURE DEVICE FOR ENCOURAGING THE LAYING OF EGGS BY DOMESTIC FOWLS PARTICULARLY TURKEYS

[76] Inventor: Gilad Rafaely, Givat Chaim-Ihud, Israel

[21] Appl. No.: 908,009

[22] Filed: May 22, 1978

[30] Foreign Application Priority Data

Jun. 1, 1977 [IL] Israel .................................. 52211

[51] Int. Cl.² ........................................... A01K 31/14
[52] U.S. Cl. ....................................................... 119/48
[58] Field of Search ................................... 119/48, 45

[56] References Cited

U.S. PATENT DOCUMENTS

| | | | |
|---|---|---|---|
| 2,975,759 | 3/1961 | Stromblad | 119/48 X |
| 3,027,871 | 4/1962 | Peterson | 119/45 R |
| 3,139,065 | 6/1964 | Willauer, Jr. | 119/48 |
| 3,157,156 | 11/1964 | Peterson et al. | 119/45 R |

Primary Examiner—Louis G. Mancene
Assistant Examiner—Daniel J. Leach

[57] ABSTRACT

Described is an enclosure device for encouraging the laying of eggs by domestic fowls particularly turkeys, comprising a cage open at opposite ends, one end constituting the fowl-entry end for permitting the entry and exit of the domestic fowl, and the opposite end constituting the egg-removal end for removing the egg layed by the fowl when in the cage. An ejector member is movable within the cage to force the fowl to exit from the fowl-entry end; and an egg-removing member is coupled to the ejector member within the cage to remove any eggs therein through the egg-removal end. The device further includes a drive for driving the ejector member and the egg-removal member first to force the fowl out of the cage from the fowl-entry end, and then to remove any egg therein from the egg-removal end.

10 Claims, 4 Drawing Figures

ENCLOSURE DEVICE FOR ENCOURAGING THE LAYING OF EGGS BY DOMESTIC FOWLS PARTICULARLY TURKEYS

BACKGROUND OF THE INVENTION

The present invention relates to an enclosure device for encouraging the laying of eggs by domestic fowls, particularly turkeys.

Turkey farms are commonly provided with such enclosures, commonly called laying cages, each adapted to accommodate one turkey which enters the cage when it desires to lay an egg. After the egg has been layed, the turkey has a natural desire to remain sitting on the egg in order to hatch it. The operator of the farm periodically inserts his hand into the cage first to chase out the turkey, and then to remove any egg layed therein by the turkey. This is an arduous, timing-consuming, and unpleasant task, and is therefore usually performed only at relatively long time intervals, for example two hours or more, which is a considerably longer period of time than required for the turkey for actually laying the egg.

OBJECTS AND SUMMARY OF THE INVENTION

An object of the present invention is to provide a laying cage or enclosure device of the above type but having advantages in the above respects.

According to a broad aspect of the present invention, there is provided an enclosure cage device for encouraging the laying of eggs by domestic fowls, particularly turkeys, comprising a cage open at opposite ends, one end constituting the fowl-entry end for permitting the entry and exit of the domestic fowl, and the opposite end constituting the egg-removal end for removing the egg layed by the fowl when in the cage. An ejector member is movable within the cage to force the fowl to exit from the fowl-entry end; and an egg-removing member is coupled to the ejector member within the cage to remove any eggs therein through the egg-removal end. The device further includes a drive for driving the ejector member and the egg-removal member first to force the fowl out of the cage from the fowl-entry end, and then to remove any egg therein from the egg-removal end.

For purposes of example, the invention is described below with respect to one preferred embodiment, in which each of the ejector members is pivotably mounted at its upper end to the top of the cage to swing through a forward stroke from the egg-removal end of the cage towards the fowl-entry end, and then through a return stroke back towards the egg-removal end of the cage.

According to another feature in the described preferred embodiment, each of the egg-removing members is pivotably mounted at its upper end to the lower end of the ejector plate such that during the movement of the ejector member through its forward stroke, the egg-removing member is positioned to intercept any egg layed by the fowl and is pivoted to override same, and during the movement of the ejector member through its return stroke, the egg-removing member engages the egg and forces same out through the egg-removal end of the cage.

According to a further feature in the described preferred embodiment, there are a plurality of said cages, each including an ejector member and an egg-removing member, all said members being driven together by the drive, the drive including a timer for periodically actuating same at predetermined timed intervals.

According to a still further feature in the described preferred embodiment, the device includes a common conveyor at the egg-removal end of all the cages for receiving the eggs removed therefrom.

It will thus be seen that the invention increases the efficiency of laying cages in that it saves the operator the time-consuming and unpleasant task of manually chasing out each turkey from the cage and then removing any egg therein. It also increases the productive time of the laying cage in that the drive can be set for actuation at predetermined intervals more closely corresponding to the time actually needed for the turkey to lay the egg; for example, time intervals of about one-half hour have been found quite sufficient for this purpose, thereby increasing the productive time of each cage by a factor of about four compared to the existing manual procedure performed at about two hour intervals.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
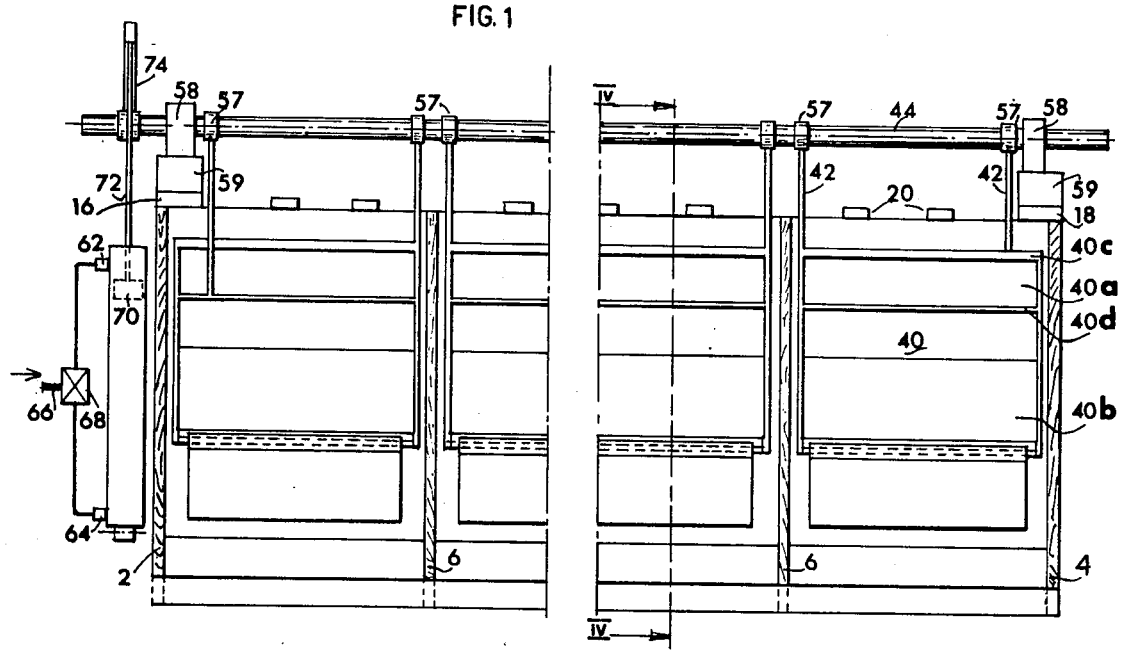
FIG. 1 is a front elevational view of a five-unit laying cage device constructed in accordance with the invention.
Figure 2:
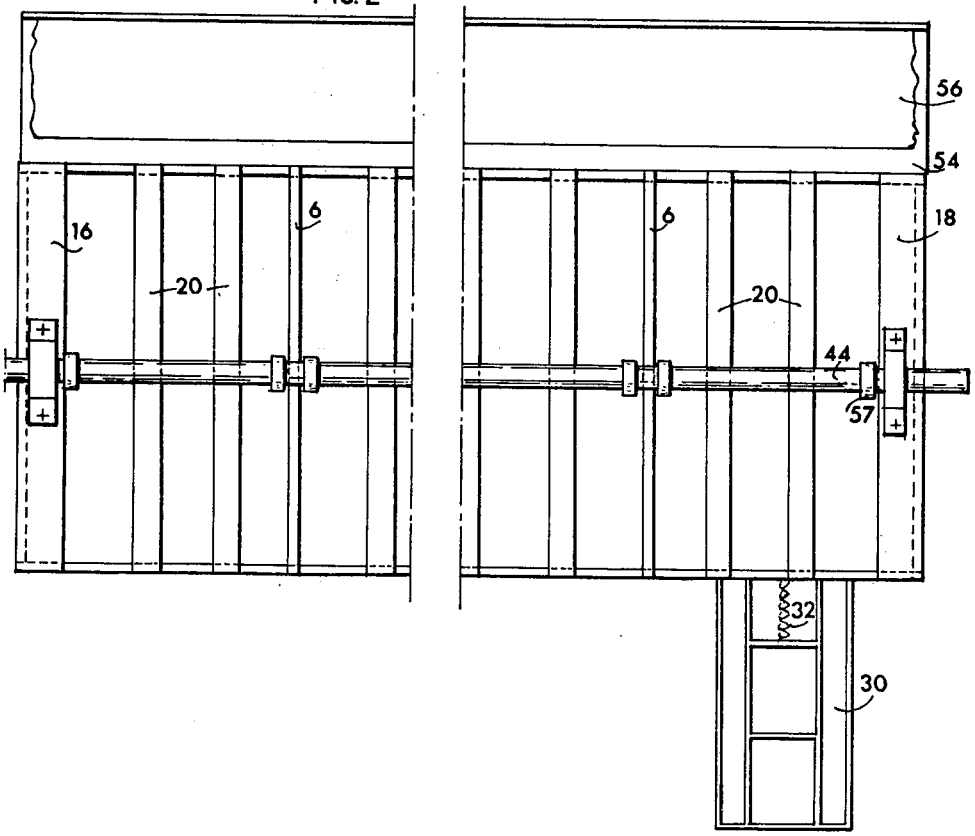
FIG. 2 is a top plan view of the device of FIG. 1.

The device illustrated in the drawings comprises a wooden frame including a pair of end walls 2, 4, and a plurality of partition walls 6 dividing the device into a plurality (in this case five) cages each for accommodating one turkey. The end partition walls are connected together by a pair of wooden boards 8, 10, extending along the top at opposite sides of the device, and a (pair of) wooden board/s 12 (, 14) extending along the bottom at (opposite) one side/s of the device. In addition, a pair of cross-boards 16, 18, are attached across the opposite ends at the top of the device, and a further plurality of smaller-width boards 20 are attached at the top of the device inbetween the end boards 16, 18. The smaller-width boards 20 are spaced from each other to provide for light and air to enter each cage, there being two such boards for each of the five cages in the illustrated five-unit device.

It will thus be seen that each of the five cages is open at its opposite ends 22, 24 (FIGS. 3 and 4), end 22 being the fowl-inlet end through which the turkey enters into and exits from the cage, and the opposite end 24 being the egg-removal end through which is removed any egg (25) layed by the turkey while in the cage. The bottom of each cage may be closed by a floor panel 26 which is secured to the frame by corner blocks 27, 28, floor 26 being preferably lined with synthetic grass 29 to provide a soft bed for the turkey when in the cage.

A door 30 is pivotably mounted at end 22 of each cage, the door being pivotable to assume either a closed position (shown in full-lines in FIG. 3) or an open position (shown in broken-lines). A bi-stable connection is provided including an over-centre spring 32 fastened at one end to the door and at the opposite end to the frame, such that when the door is pivoted from one to the other position, the spring moves past the centre of pivotal axis 34 of the door to maintain the door in its pivoted position. In addition, the door includes an operator member 36 attached at right angles thereto and actuated by the turkey itself. Thus, when the door is in its open position (shown in broken lines in FIG. 3), operator member 36 is aligned with the upper end of cage opening 22 so as to be engaged by the turkey entering the cage, the turkey pushing the operator member inwardly of the cage in the course of entering same, until spring 32 passes the centre pivot axis 34 of the door 30, thereby causing the door to pivot to, and be retained in, its closed (full-line) position, preventing the subsequent entry of another turkey. Such bi-stable, over-centre connection for the door is known per se and does not form a part of the present invention.

In accordance with the present invention, each of the cages is provided with an ejector member movable within the cage to force the turkey to exit from the cage through end 22, an egg-removing member coupled to the ejector member within the cage to remove any eggs therein through the egg-removal end 24, and a drive for driving the ejector member and the egg-removal first to force the turkey out of the cage from end 22, and then to remove any egg therein from end 24.

More particularly, each ejector member comprises a panel 40 secured by a pair of arms 42 to a common shaft 44 extending longitudinally along the top of all of the units of the device. Each panel 40 includes two sections, namely, an upper inclined section 40a, and a lower vertical section 40b which depends from section 40a at the egg-removal end 24 of the cage. Ejector panel 40 further includes an end bar 40c, and one or more intermediate bracing bars 40d.

An egg-removal plate 46 is pivotally mounted to the lower end of the depending section 40b of each ejector panel 40. For this purpose, the upper end of the egg-removal plate 46 is formed with a cylindrical sleeve 48 receiving a hinge pin 50 secured to the lower end of the ejector panel section 40b. The egg-removal plate 46 is further formed with an upper extension 52 underlying the rear end of panel section 40b, to permit the egg-removal plate 46 to pivot in one direction (clockwise in FIG. 3) with respect to panel 40, but not in the opposite direction.

As will be described more fully below, during the forward stroke of ejector member 40, when it is driven from the position illustrated in FIG. 3 towards the fowl-entry opening 22 of the cage, the egg-removal plate 46 is engaged by any egg 25 layed by the turkey while in the cage, but the plate is permitted to pivot with respect to the ejector member in order to override the egg; upon the return stroke of the ejector member, when it is driven back to its initial position (illustrated in FIG. 3), plate 46 engages the rear end of the egg and scoops it out through end 24 of the cage. When the egg is so removed from the cage, it enters a common trough 54 extending across all the cages and is deposited onto a common conveyor belt 56 movable within the trough to convey all the eggs to a central location for further handling and processing.

Shaft 44, extending across the top of all the cages, is fixed to the arms 42 of all the ejector members 40 by means of sleeves 57, and is rotatably mounted in bearings 58 at opposite ends of the device, the bearings being supported on end boards 16, 18 by spacer blocks 59. Shaft 44 is driven by a common reciprocatory drive which is periodically actuated at predetermined time intervals. The common drive includes a pneumatic cylinder 60 located at one end (left end in FIG. 1) of the device, the cylinder including a pair of ports 62, 64 at opposite ends connected to a supply of compressed air 66 via a timer controlled valve 68 to reciprocate a piston 70 within cylinder 60. The piston is connected by a stem 72 to a crank arm 74 fixed to the common drive shaft 44, such that when the cylinder 60 is actuated by the timer-controlled valve 68, its piston 70 is first driven through a forward stroke pulling down stem 72 and rotating drive shaft 44 a partial revolution (counter-clockwise in FIG. 3), and is then driven through a return stroke wherein the stem 72 and drive-shaft 44 are moved in the opposite direction back to their initial positions.

The operation of the device illustrated in the drawings will be apparent from the above description.

Figure 3:
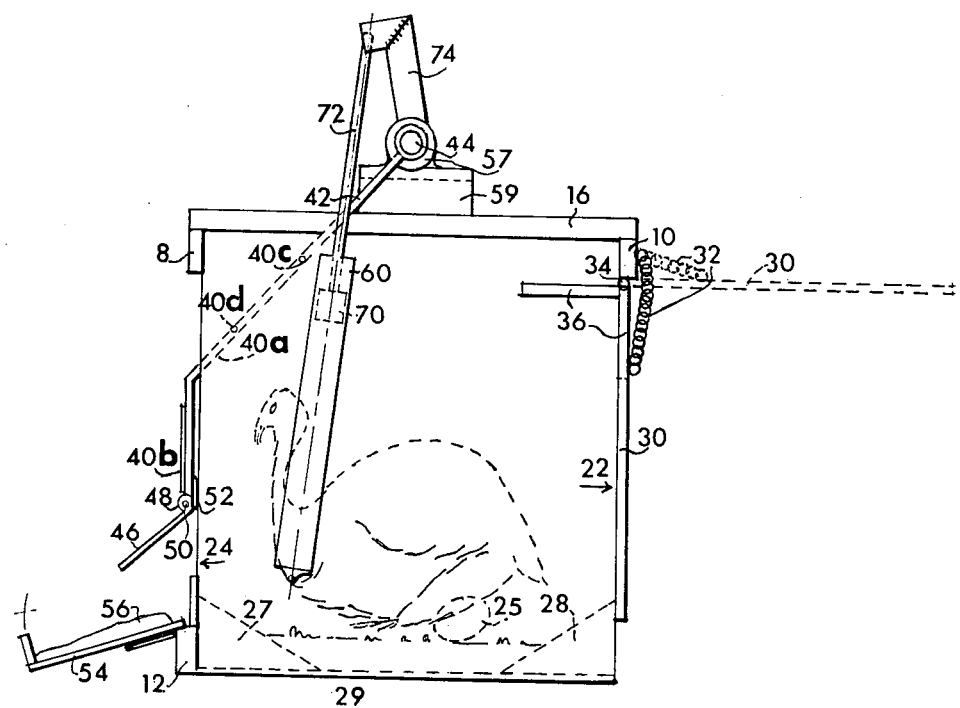
FIG. 3 is an end view of the device of FIG. 1, showing the parts in their initial condition.

Normally, when the respective cage is not occupied by a turkey, its door 30 at the fowl-entry end 22 of the cage will be in the open position as illustrated in broken-lines in FIG. 3. Turkeys who are about to lay eggs may therefore enter the respective cages. As soon as a turkey enters a cage, the turkey engages door operator 36 causing the door 30 to close behind it, the door being retained closed by the over-centre spring 32.

The turkey is thus substantially isolated within its cage; this is conducive for it to lay an egg.

Figure 4:
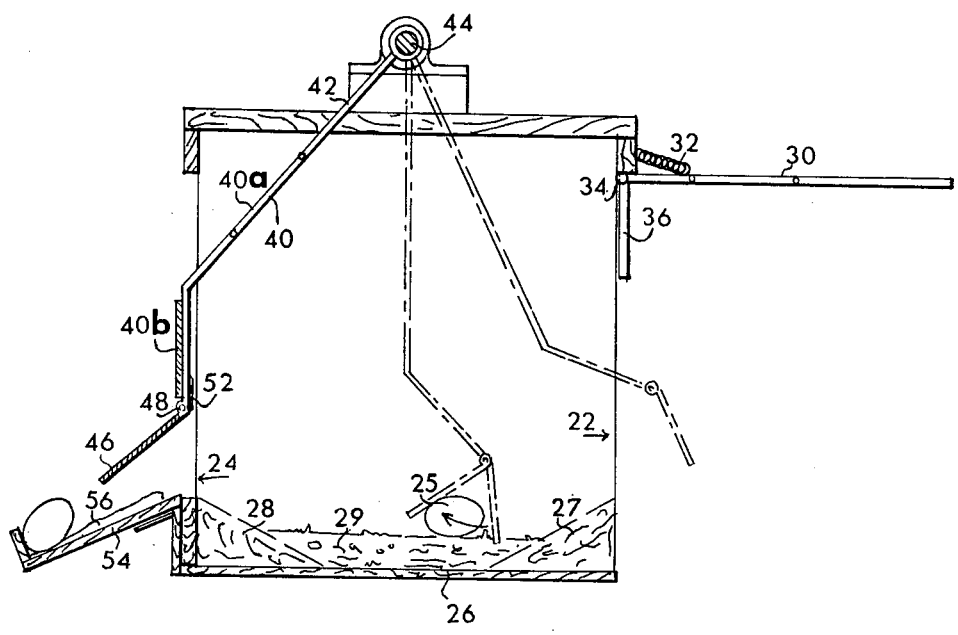
FIG. 4 is a sectional view along lines IV—IV of FIG. 1, showing the parts in various intermediate, actuated positions.

At predetermined time intervals, for example, each one-half hour, timer-valve 68 actuates cylinder 60 to cause it to pull-in its stem 72, and thereby to rotate the common drive shaft 44 first (counter-clockwise in FIG. 3) through a forward stroke, and then through a return stroke. During the forward stroke, all the ejector members 40 are moved from their initial positions, wherein the depending section 40b of each is vertically aligned with the egg-removing end 24 of the respective cage, towards the fowl-entry end 22 of the cage, as shown in FIG. 4. The movement of the ejector members 40 during this forward stroke forces the turkey within each cage to exit, the turkey pushing door 30 to its open position, in which position it remains because of the over-centre spring connection 32. During this forward stroke, the egg-removal plate 46 in each cage engages any egg 25 layed by the turkey while in the cage, but because of the pivotal connection (sleeve 50 received within hinge pin 48) of plate 46, the plate pivots and thus overrides the egg. When cylinder 60 is actuated to drive shaft 44 through the return stroke, all the ejector members 40 are returned to their initial positions. During this return movement of the ejector members, the egg-removal plate 46 on each member is not permitted to pivot because of its extension 52, and therefore if this plate intercepts an egg 25 layed by the turkey while in the cage, it will scoop-up the egg and force it through end 24 of the cage onto the conveyor belt 56 movable within the common trough 54 extending along all the cages. Conveyor belt 56 may be periodically actuated to convey all the eggs received thereon to a common point for further handling or processing.

It will thus be seen that the timer within unit 68 may be preset according to any desired time interval, for example, each one-half hour, so as to force out the turkeys from all the cages and to scoop any eggs layed therein onto the common conveyor belt 56.

While the invention has been described with respect to one preferred embodiment, it will be appreciated that many variations, modifications and other applications may be made.

What is claimed is:

1. An enclosure device for encouraging the laying of eggs by domestic fowls particularly turkeys, comprising:

a cage open at opposite ends, one end constituting the fowl-entry end for permitting the entry and exit of the domestic fowl, and the opposite end constituting the egg-removal end for removing the egg layed by the fowl when in the cage; an ejector member movable within said cage to force the fowl to exit from said fowl-entry end; an egg-removing member coupled to said ejector member within said cage to remove any eggs therein through said egg-removal end; and a drive for driving said ejector member and said egg-removal member first to force the fowl out of the cage from said fowl-entry end, and then to remove any egg therein from said egg-removal end.

2. A device according to claim 1, wherein there are a plurality of said cages each including an ejector-member and an egg-removal member, said drive being common to all said members.

3. A device according to claim 1, wherein said drive includes a motor and a timer periodically actuating same in predetermined time intervals.

4. A device according to claim 1, wherein said ejector member is pivotably mounted at its upper end to the top of the cage to swing through a forward stroke from said egg-removal end of the cage towards said fowl-entry end, and then through a return stroke back towards said egg-removal end of the cage.

5. A device according to claim 4, wherein said egg-removing member is pivotably mounted at its upper end to the lower end of the ejector member such that during the movement of the ejector member through its forward stroke, said egg-removing member is positioned to intercept any egg layed by the fowl and is pivoted to override same, and during the movement of the ejector member through its return stroke, said egg-removing member engages the egg and forces same out through said egg-removal end of the cage.

6. A device according to claim 5, wherein there are a plurality of said cages, each including an ejector member and an egg-removing member, all said members being driven together by said drive, said drive including a timer for periodically actuating same in predetermined timed intervals.

7. A device according to claim 6, wherein each of said ejector members is a plate all of which plates are mounted to a shaft extending across the upper end of all the cages, said shaft being partially rotated by said drive in opposite directions to drive said plates through a forward stroke and then through a return stroke.

8. A device according to claim 7, wherein said drive includes a reciprocating fluid motor partially rotating said shaft in one direction during the forward stroke and returning the shaft in the opposite direction during the return stroke.

9. A device according to claim 2, further including a common conveyor at the egg-removal end of all the cages for receiving the eggs removed therefrom.

10. A device according to claim 1, wherein the fowl-entry end of each said cage includes a door pivotable from a closed position by the fowl entering the cage to an open position by the ejector member when forcing the fowl to exit therefrom, said door having a bi-stable over-centre connection for maintaining the door stable in each of the above two positions.

* * * * *